(12) United States Patent
Daoud

(10) Patent No.: US 6,180,887 B1
(45) Date of Patent: Jan. 30, 2001

(54) CLIP FOR FORMING A BRANCH OFF SEAL AND METHOD OF USING THE CLIP

(75) Inventor: Bassel Hage Daoud, Parsippany, NJ (US)

(73) Assignee: Avaya Technology Corp., Miami Lakes, FL (US)

(*) Notice: Under 35 U.S.C. 154(b), the term of this patent shall be extended for 0 days.

(21) Appl. No.: 09/371,359

(22) Filed: Aug. 10, 1999

(51) Int. Cl.⁷ ................................................. H02G 15/08
(52) U.S. Cl. ................................ 174/84 R; 174/DIG. 8; 174/88 R
(58) Field of Search ........................ 174/84 R, 88 R, 174/DIG. 8, 92, 93, 71 R, 72 R; 156/85, 86

(56) References Cited

U.S. PATENT DOCUMENTS

| | | | |
|---|---|---|---|
| 4,298,415 | 11/1981 | Nolf | 156/85 |
| 4,400,579 | 8/1983 | Nolf | 174/84 R |
| 4,413,922 | * 11/1983 | Nolf | 174/88 R X |
| 4,648,924 | 3/1987 | Nolf | 156/85 |
| 4,734,543 | 3/1988 | Nolf | 174/88 |
| 4,913,522 | 4/1990 | Nolf et al. | 350/96.2 |
| 5,155,794 | 10/1992 | Nolf et al. | 385/135 |
| 5,249,253 | 9/1993 | Franckx et al. | 385/135 |
| 5,602,954 | 2/1997 | Nolf et al. | 385/135 |

* cited by examiner

Primary Examiner—Kristine Kincaid
Assistant Examiner—Chau N. Nguyen
(74) Attorney, Agent, or Firm—Duane Morris & Heckscher LLP; Steven E. Koffs

(57) ABSTRACT

A clip assembly has a pivot pin and a plurality of elongated legs. All of the legs of the clip assembly are identical to each other. Each leg has at least one hinge portion at or near a first end of the leg. The hinge portion is substantially shorter than the leg. Each hinge portion has a hole. The holes of the hinge portions are aligned with each other. Each leg has a second end opposite the first end. The pivot pin passes through the hole in each one of the hinge portions without extending significantly beyond the hinge portions in the direction of the second ends of the legs. Each leg is freely rotatable about the pivot pin. The legs are located at positions defining a cylinder that has a longitudinal axis along which the pivot pin lies; preferably the assembly consists of the pivot pin and the plurality of legs, without a central post along the longitudinal axis of the cylinder. The legs may each have two hinge portions, a first hinge portion at the first end, and a second hinge portion separated from the first hinge portion by a distance greater than the longitudinal lengths of the first and second hinge portions. The plurality of legs are positioned so that all of the first hinge portions are adjacent to each other, and all of the second hinge portions are adjacent to each other.

14 Claims, 5 Drawing Sheets

CLIP FOR FORMING A BRANCH OFF SEAL AND METHOD OF USING THE CLIP

FIELD OF THE INVENTION

The present invention relates to telecommunications equipment generally, and more specifically, to methods for securing cables.

DESCRIPTION OF THE RELATED ART

A building entrance protector (BEP) enclosure houses the physical interface between the nodes of a local telecommunications network and a telecommunications cable. For example, a BEP enclosure may house the interface hardware between the telephones of an office building and an exterior telephone cable having a number of twisted copper pairs that carry the voice signals for those telephones. A BEP enclosure is typically mounted in the basement or first floor of the office building. A BEP enclosure may also be used to house the interface hardware for systems based on fiber optical communications. Similarly, BEP enclosures may be used with telecommunications systems carrying signals other than just telephone voice signals.

The end cap of a BEP may include one or more cable ports, which extend outwardly from the end cap. The cable port allows a cable to enter into the enclosure. Heat shrink tubing is commonly used to secure the cable to the BEP housing, align the cable, and to provide a seal to protect the enclosure from the outdoor environments.

The end cap of the BEP typically has a limited number of cable ports through which cables may enter the BEP housing. There may be more cables than cable ports. A problem may arise if it is necessary to route two or more cables through a single port. Attempts have been made to address this problem by forming a branch in a single length of shrink wrap tubing.

U.S. Pat. Nos. 4,298,415; 4,400,579; 4,648,924; and 4,734,543 to Nolf are expressly incorporated by reference herein in their entireties. These patents describe a device by which a branch-off seal is effected between a heat-recoverable sleeve (such as a tubular or wraparound sleeve made from cross-linked polymeric material) and two or more electrical cables by using one or more clips. The outer legs of the clips are positioned over the outer surface of the sleeve so as to form an appropriate number of conduits, and heat is applied to cause the sleeve to shrink about the cables positioned within the conduits. Nolf teaches that the preferred clips are formed as a trident, the central leg of which extends into the heat-recoverable sleeve and is provided with a layer of a hot-melt adhesive or another sealant so as to enhance the seal formed at the branch-off.

Nolf's method includes positioning a clip having at least two elongate legs over the outer surface of the heat-shrinkable sleeve at the end thereof so as to form at least two terminal conduits. The cables are positioned within the conduits. Heat is applied so as to effect shrinkage and to form the desired seal.

Nolf describes several variations and embodiments of the clip and methods for using the clip. FIGS. 1A and 1B of the present application corresponds to FIGS. 13a and 13b of each of the above listed patents by Nolf. FIGS. 1A and 1B show an adjustable clip having three legs 47, 48 and 50. In this clip, two of the outer legs 47 and 48 are rotatably mountable on an extended part of the inner leg 49, whereas outer leg 50 is fixed to the inner leg 49. Such a clip can be adjusted according to the nature of the branch-off required. Once adjusted, the leg positions are locked in place by teeth (not numbered).

An improved clip having greater flexibility and adaptability to different branching solutions is desired.

SUMMARY OF THE INVENTION

The present invention is a clip assembly including a pivot pin and a plurality of elongated legs. Each leg has at least one hinge portion at or near a first end of the leg. The hinge portion is substantially shorter than the leg. Each hinge portion has a hole. The holes of the hinge portions are aligned with each other. Each leg has a second end opposite the first end. The pivot pin passes through the hole in each one of the hinge portions, without extending significantly beyond the hinge portions in the direction of the second ends of the legs. Each leg is freely rotatable about the pivot pin.

DETAILED DESCRIPTION

Figure 2A:
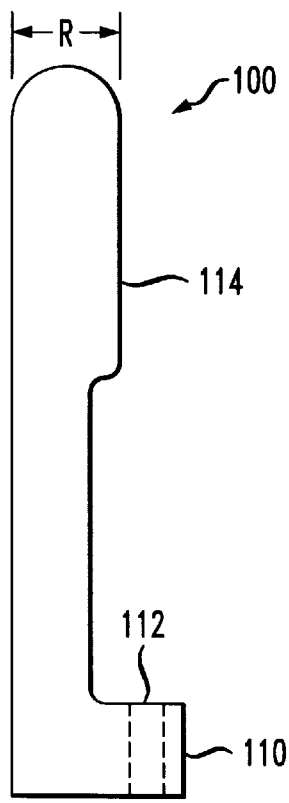
FIG. 2A is an elevation view of a first exemplary leg for use in a clip assembly according to the present invention.
Figure 2B:
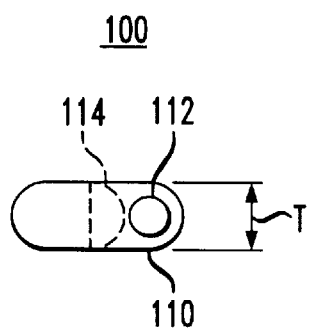
FIG. 2B is a bottom plan view of the leg shown in FIG. 2A.

FIGS. 2A and 2B show a first exemplary leg 100 usable in a clip assembly according to the present invention.

Each leg 100 is an elongated structure having at least one hinge portion 110 at or near a first end of the leg. In the exemplary leg 100 of FIG. 2A, the hinge portion 110 is located at the first end, which is the preferred location. The hinge portion 110 is substantially shorter than the leg 100. Each hinge portion has a hole 112. Each leg 100 has a second end opposite the hinge portion 110. Each leg 100 has a separator portion 114 at its second end. The separator portion 114 has a radial dimension R (shown in FIG. 2A) and a tangential dimension T (shown in FIG. 2B). The radial dimension R is greater than the tangential dimension T. The narrower tangential dimension T allows a greater number of legs to fit within the circumference defined by any given cable port.

The legs 100 should be made of a strong material that does not degrade when exposed to heat. Steel is an example of a suitable material. A plastic coating may be desirable over the steel to prevent any sharp edges of the leg 100 from damaging the tubing or injuring a worker handling the legs. Alternatively, any other suitable material described in U.S. Pat. No. 4,734,543 (which is incorporated by reference herein) may be used.

Figure 3A:
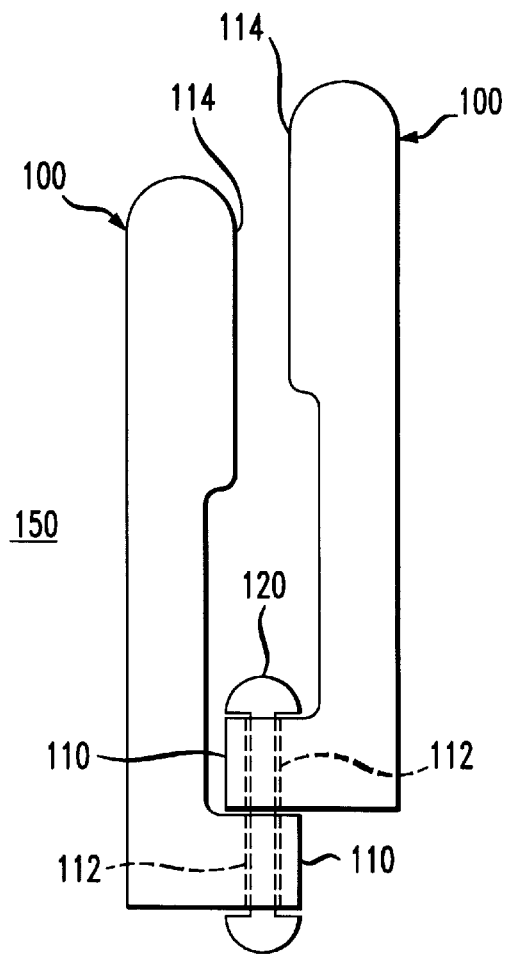
FIG. 3A is an elevation view of a clip assembly according to the present invention, including two of the legs shown in FIG. 2A.
Figure 3B:
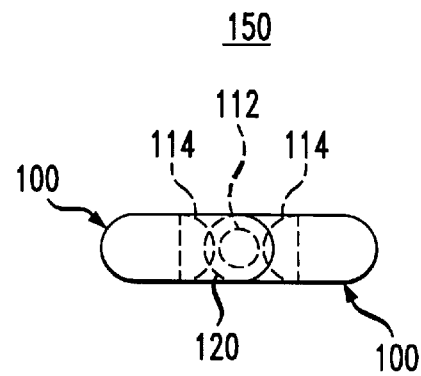
FIG. 3B is a bottom plan view of the clip assembly shown in FIG. 3A.

FIGS. 3A and 3B show a first exemplary clip assembly 150 incorporating the legs 100 of FIG. 2A. Assembly 150 includes two legs 100. According to an aspect of the invention, all of the legs of the clip assembly 150 are identical to each other, simplifying inventory management and assembly of the clip 150.

The holes 112 of the hinge portions 110 are aligned with each other. A pivot pin 120 passes through the aligned holes in each one of the hinge portions 110, without extending significantly beyond the hinge portions in the direction of the second ends of the legs. Each leg 100 is freely rotatable about the pivot pin 120 to any desired angle. Because clip assembly 150 can form any desired angle, clip assembly 150 may be used to form any desired pair of conduits from a single piece of heat shrink tubing, as discussed below.

Figure 4A:
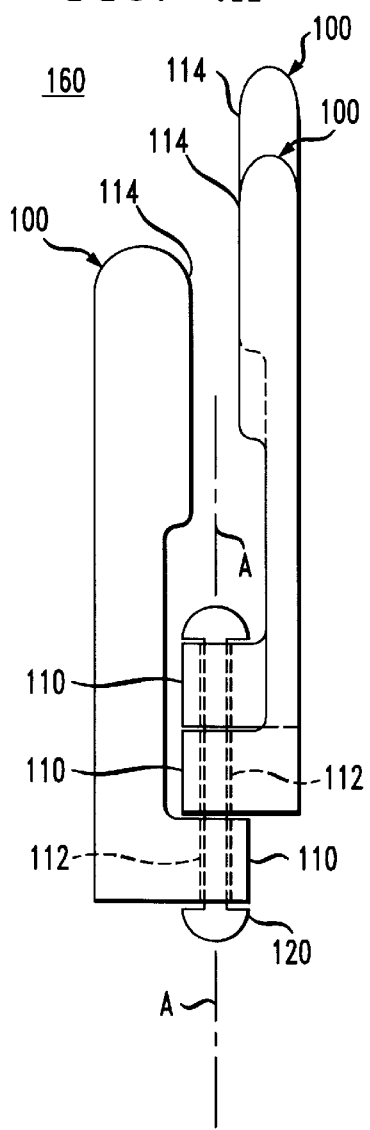
FIG. 4A is an elevation view of a clip assembly according to the present invention, including three of the legs shown in FIG. 2A.
Figure 4B:
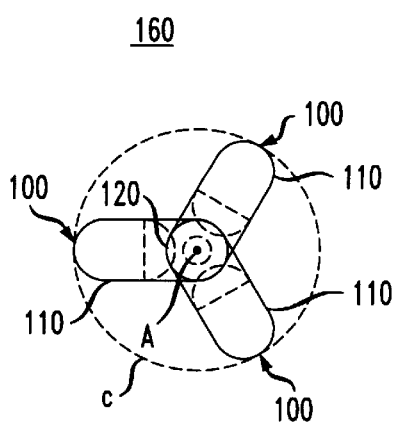
FIG. 4B is a bottom plan view of the clip assembly shown in FIG. 4A.

FIGS. 4A and 4B show a second exemplary clip assembly 160 incorporating three legs 100. All of the legs 100 of the clip assembly 160 are identical to each other. The holes 112 of the hinge portions 110 are aligned with each other. A pivot pin 120 passes through the aligned holes in each one of the hinge portions 110, without extending significantly beyond the hinge portions in the direction of the second ends of the legs. Each leg 100 is freely rotatable about the pivot pin 120 to any desired angle.

Figure 5A:
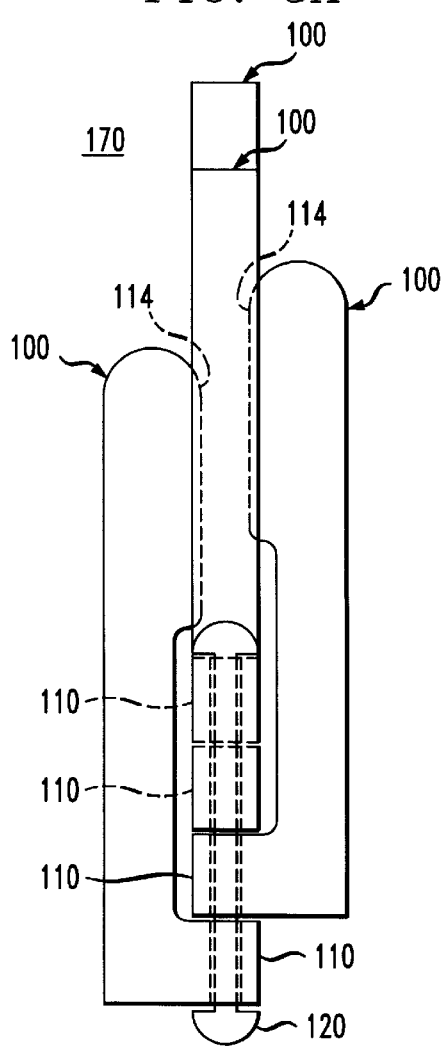
FIG. 5A is an elevation view of a clip assembly according to the present invention, including four of the legs shown in FIG. 2A.
Figure 5B:
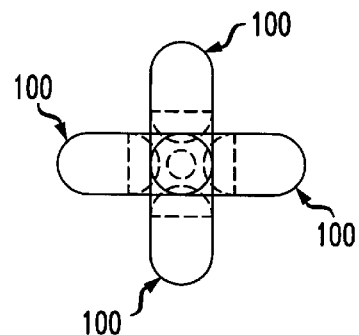
FIG. 5B is a bottom plan view of the clip assembly shown in FIG. 5A.

FIGS. 5A and 5B show a third exemplary clip assembly 170 incorporating four legs 100. All of the legs 100 of the clip assembly 170 are identical to each other. The holes 112 of the hinge portions 110 are aligned with each other. A pivot pin 120 passes through the aligned holes in each one of the hinge portions 110, without extending significantly beyond the hinge portions in the direction of the second ends of the legs. Each leg 100 is freely rotatable about the pivot pin 120 to any desired angle.

The pivot pin 120 may be of a conventional type. Preferably, the pin 120 has two pieces which are detachable from each other, to allow the clip assembly 150, 160 or 170 to be disassembled and reassembled. However, if a clip assembly 150, 160 or 170 is to be permanently assembled, then the pivot pin 120 may be a single piece fastener, such as a rivet or the like.

Figure 1A:
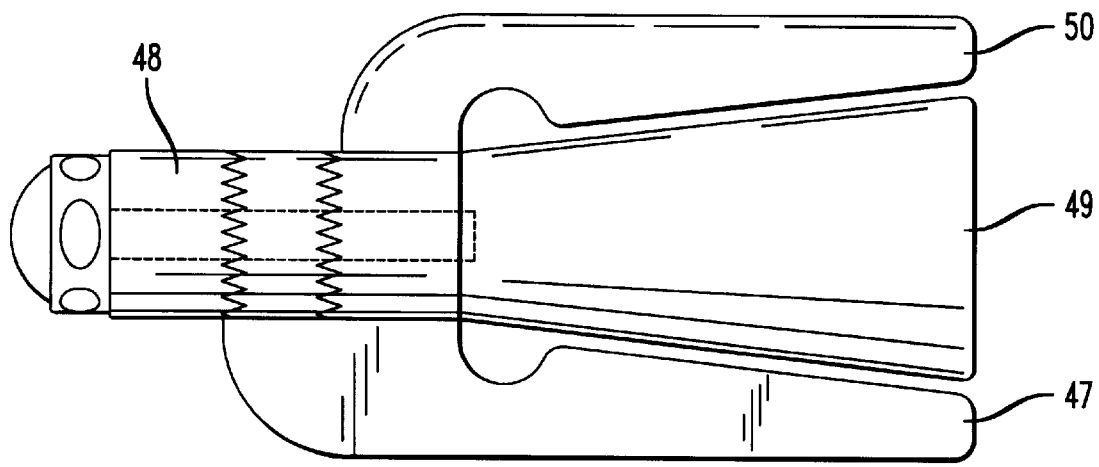
FIGS. 1A and 1B show a conventional clip for forming a branch in a sleeve of shrink wrap tubing.
Figure 1B:
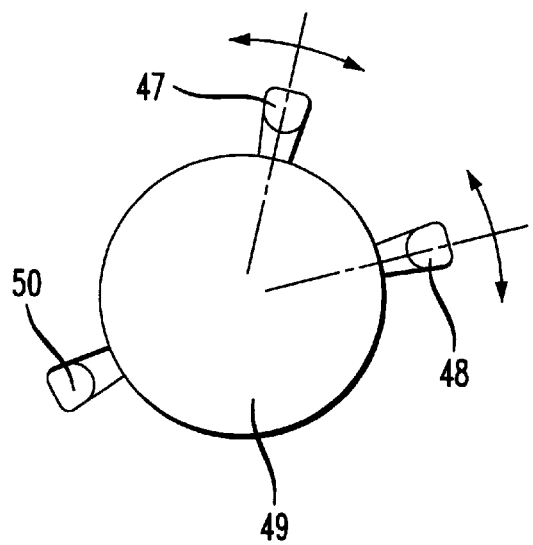

Another aspect of the exemplary embodiments is best shown in FIGS. 4A and 4B. The legs 100 are located at positions defining a cylinder C (FIG. 4B) that has a longitudinal axis A (FIG. 3A) along which the pivot pin 120 lies. The exemplary assembly 160 consists of the pivot pin 120 and the plurality of legs 100, without any central post along the longitudinal axis A of the cylinder C. Thus, unlike the conventional clip shown in FIGS. 1A and 1B, there is not center post (item 49 in FIGS. 1A and 1B) extending in between the conduits formed by the heat shrink tubing.

Figure 6:
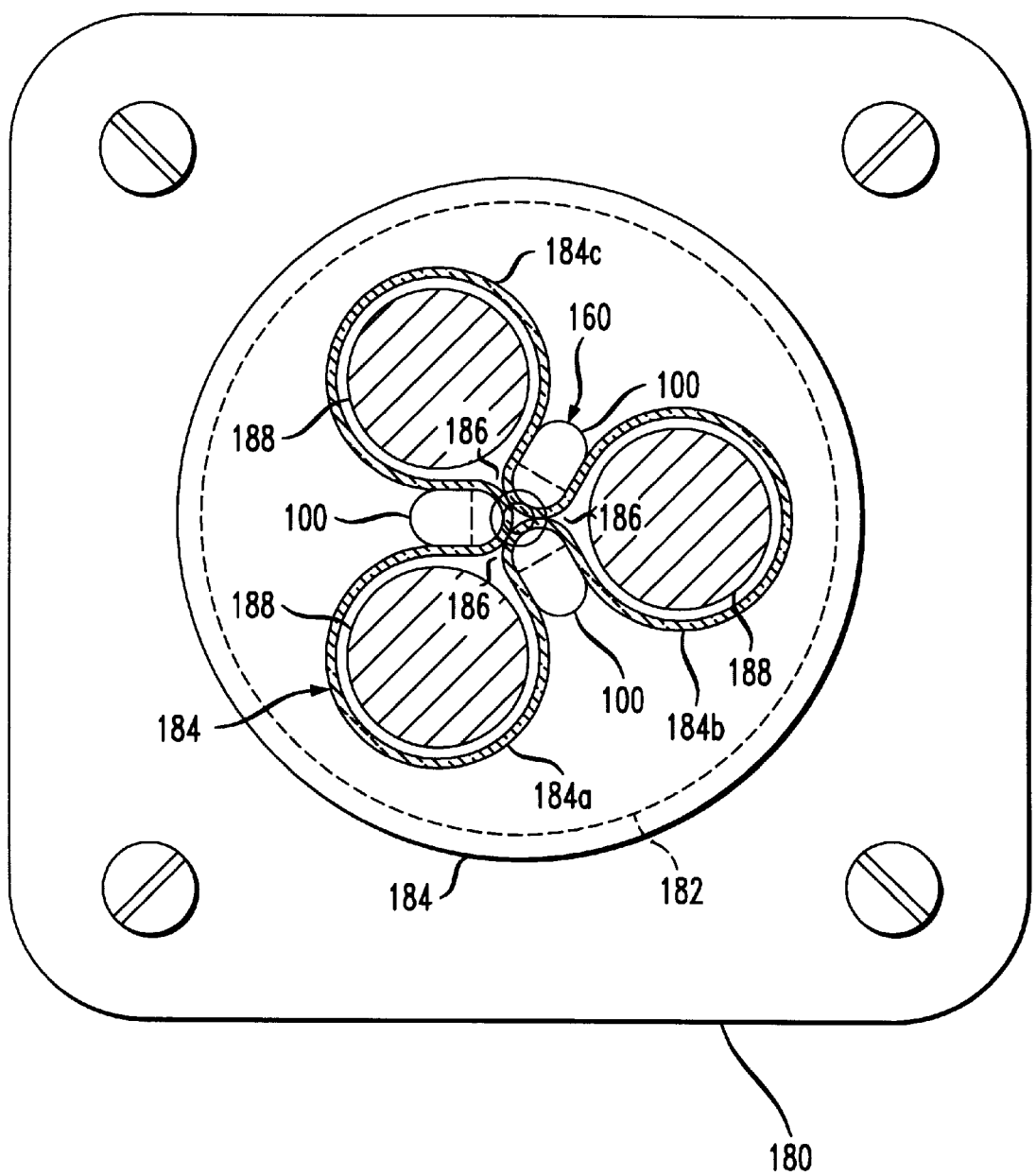
FIG. 6 is a bottom plan view of a branched sleeve of shrink wrap tubing forming three conduits. The branch is formed using the clip assembly shown in FIGS. 4A and 4B.

As best shown in FIG. 6, it is advantageous to have a clip assembly 160 without a center post. FIG. 6 is a bottom plan view showing an assembly for forming three conduit branches 184a–184c from a single sleeve of heat shrink tubing 184. One end of the tubing 184 is proximate to the cable port 182 (shown in phantom), and is positioned over the cable port 182. The cables 188 are inserted through the heat shrink tubing sleeve 184. The clip assembly 160 is fit over the end of the heat shrink tubing 184 distal from the cable port 182, to form the three conduits 184a–184c.

Because there is no center post, the three legs 100 of clip assembly 160 come close to each other near the longitudinal axis A of the assembly. The heat shrink tubing 184 is pinched together at three locations 186. An adhesive sealant is provided within the heat shrink tubing sleeve 184 for sealing gaps between the conduits. When heat is applied, the adhesive on the heat shrink tubing at the locations 186 melts, fusing the conduits 184a–184c together.

Preferably, when installing any of the clip assemblies according to the invention, the legs are rotated to positions in which each leg is tangent to two of the conduits 184a–184c. This provides optimal support for the tubing 184 during the application of heat and fusing of the conduits 184a–184c.

According to another aspect of the invention, the legs 100 can rotate freely and independently of each other, both while inserting the clip assembly 150, 160 and 170 over the tubing 184, and during the heating process. Thus, the exemplary clip assemblies 150, 160 and 170 can automatically adjust themselves continuously while the heat shrink tubing 184 is being heated, to balance the force exerted by the conduits 184a–184c on the assembly. This characteristic allows the assemblies 150, 160 and 170 to optimize the leg angles each time a branching process is performed, and to reduce the stress in the heat shrink tubing after completion of the heating.

Figure 7:
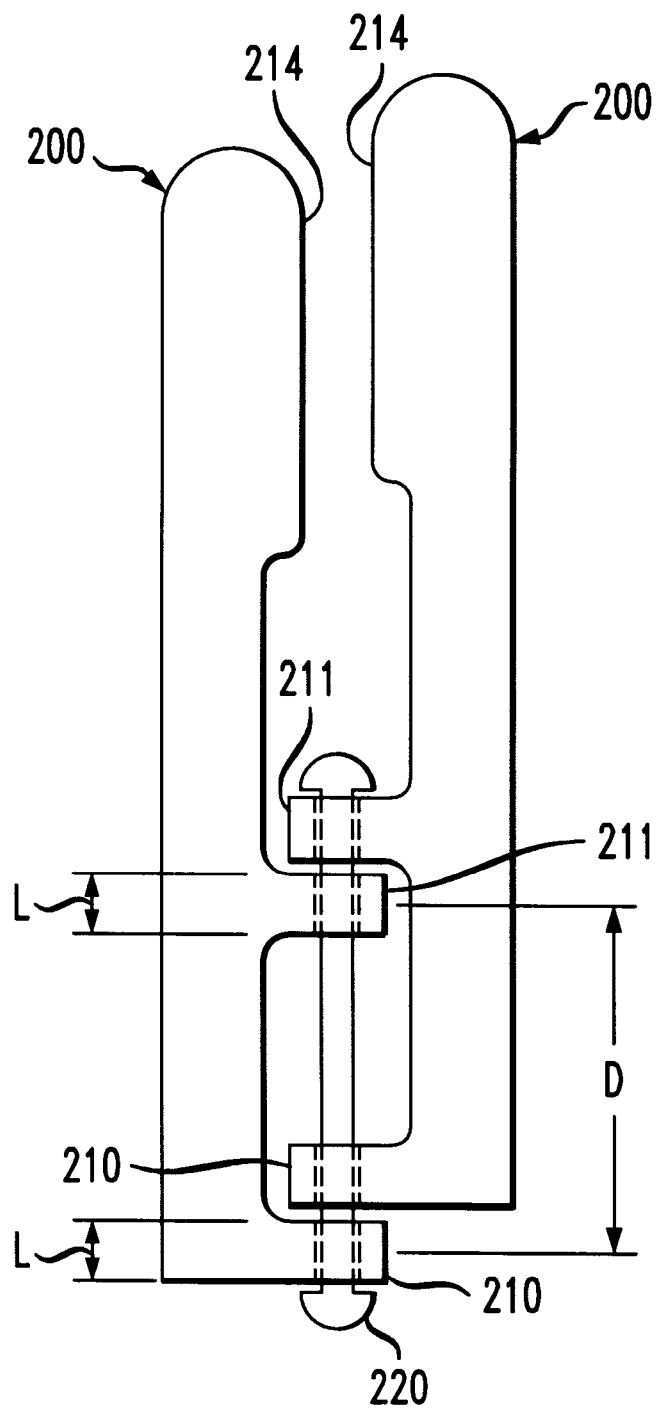
FIG. 7 is an elevation view of a clip assembly, including two legs according to a second exemplary embodiment of the present invention.

FIG. 7 shows a clip assembly 250 including a plurality of legs 200 according to second exemplary embodiment of the invention. Each of the legs 200 has a first hinge portion 210 and a second hinge portion 211. The first hinge portion 210 and second hinge portion 211 of each leg 200 are separated by a distance D greater than the longitudinal lengths L of the first and second hinge portions.

The length L is selected to be much smaller than the length of the hinge portion 110 of FIG. 2A. By using a pair of shorter, spaced apart hinge portions 210 and 211, it is possible to stack a larger number of legs 200 without excessively increasing the height of the clip assembly 250, or the distance between the bottom leg and the top leg. Preferably, the plurality of legs 200 are stacked so that all of the first hinge portions 210 are adjacent to each other, and all of the second hinge portions 211 are adjacent to each other, as shown. This arrangement minimizes overall height of the clip assembly 250. Another advantage of having two hinge portions 210 and 211 is that the spaced apart hinge portions provide greater stability. The legs 200 of clip assembly 250 are less likely to wobble than a clip assembly 150, 160 or 170 having legs 100 (FIG. 2A), which has a single hinge portion 110 shorter than the distance D separating the first and second hinge portions 210 and 211 of leg 200.

According to the present invention, an inventory of the legs 100 or 200 may be maintained. For any given heat shrink tubing sleeve to be branched, a number of legs are selected, corresponding to the number of conduits desired. The selected legs are then assembled with an appropriate pivot pin. The only component that differs between the clip assemblies is the pivot pin, which has a length corresponding to the number and length of the hinge portions 110.

Although the examples shown herein include assemblies having two, three or four legs, any desired number of legs may be used. The leg 200 shown in FIG. 7 is especially well adapted to use in assemblies have larger numbers of legs for forming a larger number of conduits. Using the embodiment of FIG. 7, clip assemblies having about ten or more legs are contemplated.

Although FIGS. 2A–7 show clip assemblies rotated to have equal angles for forming equally sized conduits, the assemblies may be used to form differently sized conduits. The legs are rotatable to form any number N of conduits, where N is an integer greater than one, and less than or equal to the number of legs in a given clip assembly, and each of the N conduits has a respective size. To form differently sized conduits from the same sleeve 184 of heat shrink tubing, the legs are preferably rotated to respectively different angles, so that each conduit is tangent or near tangent to two adjacent legs.

Although a conduit branching clip assembly and method for heat shrink tubing is described with reference to securing multiple cables to a BEP housing, it is not limited to that application. The invention may be applied for forming separate heat shrink tubing conduits for securing other elongated objects to ports in other types of enclosures.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A clip assembly comprising:

a pivot pin; and a plurality of elongated legs, each leg having at least one hinge portion at or near a first end of the leg, the hinge portion being substantially shorter than the leg, each hinge portion having a hole, the holes of the hinge portions being aligned with each other, each leg having a second end opposite the first end, wherein the pivot pin passes through the hole in each one of the hinge portions without extending significantly beyond the hinge portions in the direction of the second ends of the legs, and each leg is freely rotatable about the pivot pin.

2. The clip assembly of claim 1, wherein all of the legs of the clip assembly are identical to each other.

3. The clip assembly of claim 1, wherein the hinge portion of each of the legs is located at the first end thereof.

4. The clip assembly of claim 3, wherein the hinge portion at the first end of each leg is a first hinge portion, and each of the legs has a second hinge portion, the first and second hinge portions of each leg being separated by a distance greater than the longitudinal lengths of the first and second hinge portions.

5. The assembly of claim 4, wherein the plurality of legs are positioned so that all of the first hinge portions are adjacent to each other, and all of the second hinge portions are adjacent to each other.

6. The clip assembly of claim 1, wherein the hinge portion of each leg is located at the first end of the leg, and each leg has a separator portion at the second end, the separator portion having a radial dimension and a tangential dimension, the radial dimension being greater than the tangential dimension.

7. The clip assembly of claim 1, wherein:

the legs are located at positions defining a cylinder that has a longitudinal axis along which the pivot pin lies; and the assembly consists of the pivot pin and the plurality of legs, without a central post along the longitudinal axis of the cylinder.

8. An assembly comprising:

a heat-shrinkable sleeve capable of being positioned around at least first and second cables;

a clip assembly comprising:

a pivot pin, and a plurality of elongated legs, each leg having at least one hinge portion at or near a first end of the leg, the hinge portion being substantially shorter than the leg, each hinge portion having a hole, the holes of the hinge portions being aligned with each other, each leg having a second end opposite the first end, the pivot pin passing through the hole in each one of the hinge portions without extending significantly beyond the hinge portions in the direction of the second ends of the legs, each leg being freely rotatable about the pivot pin to a position outside of the sleeve for forming, and maintaining during subsequent heat-shrinkage of the sleeve, at least two conduits for receiving the first and second cables; and sealant within the sleeve for sealing gaps between the conduits.

9. The assembly of claim 8, wherein all of the legs of the clip assembly are identical to each other.

10. The assembly of claim 8, wherein the hinge portion of each of the legs is located at the first end thereof.

11. The assembly of claim 10, wherein the hinge portion at the end of each leg is a first hinge portion, and each of the legs has a second hinge portion, the first and second hinge portions of each leg being separated by a distance greater than the longitudinal lengths of the first and second hinge portions.

12. The assembly of claim 11, wherein the plurality of legs are positioned so that all of the first hinge portions are adjacent to each other, and all of the second hinge portions are adjacent to each other.

13. The assembly of claim 8, wherein the hinge portion of each leg is located at the first end of the leg, and each leg has a separator portion at the second end thereof, the separator portion having a radial dimension and a tangential dimension, the radial dimension being greater than the tangential dimension.

14. The clip assembly of claim 8, wherein:

the legs are located at positions defining a cylinder that has a longitudinal axis along which the pivot pin lies; and the assembly consists of the pivot pin and the plurality of legs, without a central post along the longitudinal axis of the cylinder.

* * * * *